(12) United States Patent
Yan et al.

(10) Patent No.: US 12,034,741 B2
(45) Date of Patent: Jul. 9, 2024

(54) SYSTEM AND METHOD FOR CYBERATTACK DETECTION IN A WIND TURBINE CONTROL SYSTEM

(71) Applicant: General Electric Company, Schenectady, NY (US)

(72) Inventors: Weizhong Yan, Clifton Park, NY (US); Zhaoyuan Yang, Schenectady, NY (US); Masoud Abbaszadeh, Clifton Park, NY (US); Yuh-Shyang Wang, Pittsburgh, PA (US); Fernando Javier D'Amato, Niskayuna, NY (US); Hema Kumari Achanta, Schenectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 487 days.

(21) Appl. No.: 17/236,638

(22) Filed: Apr. 21, 2021

(65) Prior Publication Data

US 2022/0345468 A1 Oct. 27, 2022

(51) Int. Cl.
*H04L 9/40* (2022.01)
*G06N 5/04* (2023.01)
(Continued)

(52) U.S. Cl.
CPC .......... *H04L 63/1416* (2013.01); *G06N 5/04* (2013.01); *G06N 20/00* (2019.01); *G06F 21/55* (2013.01);
(Continued)

(58) Field of Classification Search
CPC . H04L 63/14; H04L 63/1414; H04L 63/1441; H04L 63/1408; H04L 63/1433;
(Continued)

(56) References Cited

U.S. PATENT DOCUMENTS

| 4,455,614 A | 6/1984 | Martz et al. |
| 7,225,343 B1 | 5/2007 | Honig et al. |

(Continued)

FOREIGN PATENT DOCUMENTS

| EP | 3239884 A1 | 11/2017 |
| KR | 20140109132 A | 9/2014 |

(Continued)

OTHER PUBLICATIONS

European Search Report for EP application No. 22167207.4, dated Sep. 26, 2022, 8 pages.

(Continued)

*Primary Examiner* — Shaqueal D Wade-Wright
(74) *Attorney, Agent, or Firm* — Dority & Manning, P.A.

(57) ABSTRACT

A method for detecting a cyberattack on a control system of a wind turbine includes providing a plurality of classification models of the control system. The method also includes receiving, via each of the plurality of classification models, a time series of operating data from one or more monitoring nodes of the wind turbine. The method further includes extracting, via the plurality of classification models, a plurality of features using the time series of operating data. Each of the plurality of features is a mathematical characterization of the time series of operating data. Moreover, the method includes generating an output from each of the plurality of classification models and determining, using a decision fusion module, a probability of the cyberattack occurring on the control system based on a combination of the outputs. Thus, the method includes implementing a control action when the probability exceeds a probability threshold.

20 Claims, 7 Drawing Sheets

(51) Int. Cl.
*G06N 20/00* (2019.01)
*G06F 21/55* (2013.01)
(52) U.S. Cl.
CPC ...... *H04L 63/1425* (2013.01); *H04L 63/1441* (2013.01); *H04L 63/20* (2013.01)
(58) Field of Classification Search
CPC ..... H04L 63/1425; H04L 63/20; G06F 21/50; G06F 21/55; G06F 21/552; G06F 21/554; G06F 21/577; G06N 20/00; G06N 7/01; G06N 5/074; Y02E 10/72
See application file for complete search history.

(56) References Cited

U.S. PATENT DOCUMENTS

| | | | |
|---|---|---|---|
| 7,818,276 | B2 | 10/2010 | Veillette et al. |
| 8,191,136 | B2 | 5/2012 | Dudfield |
| 8,219,356 | B2 | 7/2012 | Mihok et al. |
| 8,468,244 | B2 | 6/2013 | Redlich et al. |
| 8,756,047 | B2 | 6/2014 | Patel |
| 8,849,737 | B1 | 9/2014 | Engler |
| 8,973,123 | B2 | 3/2015 | Chong et al. |
| 8,973,124 | B2 | 3/2015 | Chong et al. |
| 9,046,886 | B2 | 6/2015 | Chong et al. |
| 9,130,983 | B2 | 9/2015 | Heo et al. |
| 9,245,116 | B2 | 1/2016 | Evans et al. |
| 9,379,951 | B2 | 6/2016 | Mihnev |
| 9,384,885 | B2 | 7/2016 | Karalis et al. |
| 9,397,997 | B2 | 7/2016 | Chong et al. |
| 9,405,900 | B2 | 8/2016 | Dixit et al. |
| 9,483,049 | B2 | 11/2016 | Maeda et al. |
| 9,712,553 | B2 | 7/2017 | Nguyen et al. |
| 9,998,487 | B2 | 6/2018 | Mestha et al. |
| 10,303,954 | B2 | 5/2019 | Xiao et al. |
| 10,387,728 | B2 | 8/2019 | Arya et al. |
| 10,417,415 | B2 | 9/2019 | Abbaszadeh et al. |
| 10,594,712 | B2 | 3/2020 | Mestha et al. |
| 10,678,912 | B2 | 6/2020 | Mestha et al. |
| 10,728,282 | B2 | 7/2020 | Mestha et al. |
| 2002/0032717 | A1 | 3/2002 | Malan et al. |
| 2007/0289013 | A1 | 12/2007 | Lim |
| 2008/0288330 | A1 | 11/2008 | Hildebrand et al. |
| 2011/0020122 | A1 | 1/2011 | Parthasarathy et al. |
| 2011/0272161 | A1 | 11/2011 | Kumaran et al. |
| 2012/0209539 | A1 | 8/2012 | Kim |
| 2013/0104236 | A1 | 4/2013 | Ray et al. |
| 2013/0132149 | A1 | 5/2013 | Wei et al. |
| 2013/0204664 | A1 | 8/2013 | Romagnolo et al. |
| 2013/0291115 | A1 | 10/2013 | Chong et al. |
| 2013/0318022 | A1 | 11/2013 | Yadav et al. |
| 2014/0103652 | A1 | 4/2014 | Ubben et al. |
| 2014/0107521 | A1 | 4/2014 | Galan |
| 2014/0201780 | A1 | 7/2014 | Wong et al. |
| 2014/0244192 | A1 | 8/2014 | Craig et al. |
| 2014/0283047 | A1 | 9/2014 | Dixit et al. |
| 2014/0297635 | A1 | 10/2014 | Orduna et al. |
| 2014/0298399 | A1 | 10/2014 | Heo et al. |
| 2014/0337973 | A1 | 11/2014 | Foster et al. |
| 2014/0359708 | A1 | 12/2014 | Schwartz |
| 2015/0033341 | A1 | 1/2015 | Schmidtler et al. |
| 2015/0095003 | A1 | 4/2015 | Horowitz et al. |
| 2015/0118047 | A1 | 4/2015 | Yoon et al. |
| 2015/0149174 | A1 | 5/2015 | Gollan et al. |
| 2015/0249864 | A1 | 9/2015 | Tang et al. |
| 2015/0346706 | A1 | 12/2015 | Gendelman |
| 2016/0033941 | A1 | 2/2016 | T et al. |
| 2016/0127931 | A1 | 5/2016 | Baxley et al. |
| 2016/0212100 | A1 | 7/2016 | Banerjee |
| 2016/0222816 | A1 | 8/2016 | Chen et al. |
| 2016/0328654 | A1 | 11/2016 | Bauer et al. |
| 2016/0333855 | A1 | 11/2016 | Lund et al. |
| 2016/0341636 | A1 | 11/2016 | Rajaram et al. |
| 2016/0369777 | A1* | 12/2016 | Chiang ............... G05B 23/024 |
| 2017/0034205 | A1 | 2/2017 | Canedo et al. |
| 2017/0052960 | A1 | 2/2017 | Alizadeh-Shabdiz et al. |
| 2017/0054751 | A1 | 2/2017 | Schneider et al. |
| 2017/0142133 | A1 | 5/2017 | Kallos |
| 2017/0244726 | A1 | 8/2017 | Finkel et al. |
| 2017/0284896 | A1 | 10/2017 | Harpale et al. |
| 2017/0310690 | A1 | 10/2017 | Mestha et al. |
| 2017/0352245 | A1 | 12/2017 | Maher et al. |
| 2018/0115561 | A1 | 4/2018 | Sun et al. |
| 2018/0137277 | A1 | 5/2018 | Mestha et al. |
| 2018/0157831 | A1 | 6/2018 | Abbaszadeh et al. |
| 2018/0268264 | A1 | 9/2018 | Marwah et al. |
| 2018/0276375 | A1 | 9/2018 | Arov et al. |
| 2018/0367550 | A1 | 12/2018 | Musuvathi et al. |
| 2019/0190938 | A1* | 6/2019 | Oba ....................... H04L 43/16 |
| 2019/0362070 | A1* | 11/2019 | Abbaszadeh ......... G06F 21/554 |
| 2020/0125739 | A1* | 4/2020 | Verma ..................... H04L 9/008 |
| 2020/0210537 | A1* | 7/2020 | Wang ..................... G06F 30/20 |
| 2020/0244677 | A1 | 7/2020 | Abbaszadeh et al. |
| 2023/0164156 | A1* | 5/2023 | Grossman ............... F03D 17/00 726/22 |

FOREIGN PATENT DOCUMENTS

| | | |
|---|---|---|
| WO | WO2014/144857 A2 | 9/2014 |
| WO | WO2015/092817 A1 | 6/2015 |
| WO | WO2016/020660 A1 | 2/2016 |
| WO | WO2016/139097 A1 | 9/2016 |
| WO | WO2016/172514 A1 | 10/2016 |
| WO | WO2016/176682 A1 | 11/2016 |
| WO | WO 2021/066867 A1 | 4/2021 |

OTHER PUBLICATIONS

Almalawi et al., An Unsupervised Anomaly-based Detection Approach for Integrity Attacks on SCADA Systems, ScienceDirect, Computers & Security, vol. 46, Oct. 2014, pp. 94-110. (Abstract Only) https://doi.org/10.1016/j.cose.2014.07.005.

Datta et al, Cyber Threat Analysis Framework for the Wind Energy Based Power System, CPS '17: Proceedings of the 2017 Workshop on Cyber-Physical Systems Security and Privacy, Nov. 2017, pp. 81-92. https://doi.org/10.1145/3140241.3140247.

Gao et al., On Cyber Attacks and Signature Based Intrusion Detection for Modbus Based Industrial Control Systems, Journal of Digital Forensics, Security and Law, vol. 9, No. 1, 2014, 20 Pages.

Jiang et al., Wind Turbine Fault Detection Using a Denoising Autoencoder with Temporal Information, IEEE, Journals & Magazines, IEEE/ASME Transactions on Mechatronics, vol. 23, Issue 1, Feb. 2018, pp. 89-100. (Abstract Only) https://doi.org/10.1109/TMECH.2017.2759301.

Karimipour et al., Relaxation-based Anomaly Detection in Cyber-Physical Systems Using Ensemble KalmanFilter, ResearchGate, IET Cyber-Physical Systems Theory & Applications, vol. 5, Issue 1, 2020, p. 49-58. https://www.researchgate.net/deref/http%3A%2F%2Fdx.doi.org%2F10.1049%2Fiet-cps.2019.0031.

Kerres et al., Economic Evaluation of Maintenance Strategies for Wind Turbines: A Stochastic Analysis, The Institution of Engineering and Technology (IET), Journals & Magazines, IET Renewable Power Generation, vol. 9, Issue 7, Sep. 2015, pp. 766-774. (Abstract Only) https://doi.org/10.1049/iet-rpg.2014.0260.

Knowles et al., A Survey of Cyber Security Management in Industrial Control Systems, International Journal of Critical Infrastructure Protection, vol. 9, 2015, pp. 52-80. http://dx.doi.org/10.1016/j.ijcip.2015.02.002.

Kosek et al., Ensemble Regression Model-based Anomaly Detection for Cyber-Physical Intrusion Detection in Smart Grids, 2016 IEEE Electrical Power and Energy Conference (EPEC), 2016, Ottawa, ON Canada. (Abstract Only) https://doi.org/10.1109/EPEC.2016.7771704.

Li et al., Data Driven Condition Monitoring of Wind Power Plants Using Cluster Analysis, IEEE, 2015 International Conference on Cyber-Enabled Distributed Computing and Knowledge Discovery, 2015, Xi'an China. (Abstract Only) https://doi.org/10.1109/CyberC.2015.16.

(56) References Cited

OTHER PUBLICATIONS

Mantere et al., Challenges of Machine Learning Based Monitoring for Industrial Control System Networks, Advanced Information Networking and Applications Workshops (WAINA), 2012 26th International Conference, Fukuoka, Mar. 26-29, 2012, pp. 968-972.
Mohammadpourfard et al., Identification of False Data Injection Attacks with Considering the Impact of Wind Generation and Topology Reconfigurations, IEEE, Journals & Magazines, IEEE Transactions on Sustainable Energy, vol. 9, Issue 3, Jul. 2018, pp. 1349-1364. (Abstract Only) https://doi.org/10.1109/TSTE.2017.2782090.
Nalavade et al., Finding Frequent Itemsets using Apriori Algorihm to Detect Intrusions in Large Dataset, International Journal of Computer Applications & Information Technology, vol. 6, Issue 1, Jun.-Jul. 2014, pp. 84-92.
Nath, Low Latency Anomaly Detection with Imperfect Models, Dissertation University of Arkansas, May 2020, 24 pages.
Qian et al., A Novel Wind Turbine Condition Monitoring Method Based on Cloud Computing, Science Direct, Renewable Energy, vol. 135, May 2019, pp. 390-398. (Abstract Only) https://doi.org/10.1016/j.renene.2018.12.045.
Rasmussen et al., Application of Functional Modeling for Monitoring of WTG in a Cyber-Physical Environment, ResearchGate, IET Cyber-Physical Systems Theory & Applications, vol. 4, Jul. 2018, 9 Pages. https://www.researchgate.net/deref/http%3A%2F%2Fdx.doi.org%2F10.1049%2Fiet-cps.2017.0109.
Rezamand et al., A New Hybrid Fault Detection Method for Wind Turbine Blades Using Recursive PCA and Wavelet-Based PDF, IEEE, Journals & Magazines, Sensors Journal, vol. 20, Issue 4, Feb. 15, 2020, pp. 2023-2033. (Abstract Only) https://doi.org/10.1109/JSEN.2019.2948997.
Skormin et al., The Behavioral Approach to Diagnostics of Cyber-Physical Systems, AUTOTESTCON, 2014 IEEE, St. Louis, MO, Sep. 15-18, 2014, pp. 26-30.
Vanini et al., Fault Detection and Isolation of a Dual Spool Gas Turbine Engine Using Dynamic Neural Networks and Multiple Model Approach, ScienceDirect, vol. 259, Feb. 20, 2014, pp. 234-251. (Abstract Only) https://doi.org/10.1016/j.ins.2013.05.032.
Vencore Labs, Vencore Labs To Assist DARPA In Protecting The Nation's Electrical Grid, PR Newswire a cision Company, Chantilly, VA, Sep. 13, 2016, 2 Pages. http://www.econline.com/doc/vencore-labs-to-assist-darpa-in-protecting-the-nation-s-electrical-grid-0001.
Xu et al., Adaptive Fault Detection in Wind Turbine Via RF and CUSUM, The Institution of Engineering and Technology (IET), Journals & Magazines, IET Renewable Power Generation, vol. 14, Issue 10, Jul. 27, 2020, pp. 1789-1796. (Abstract Only) https://doi.org/10.1049/iet-rpg.2019.0913.
Yampikulsakul et al., Condition Monitoring of Wind Power System with Nonparametric Regression Analysis, IEEE Transactions on Energy Conversion, vol. 29, Issue 2, Jun. 2014, pp. 288-299.
Yan et al., On Accurate and Reliable Anomaly Detection for Gas Turbine Combustors: A Deep Learning Approach, Annual Conference of The Prognostics and Health Management Society, 2015, pp. 1-8.
Yi et al., Discriminative Feature Learning for Blade Icing Fault Detection of Wind Turbine, IOP Science, Measurement Science and Technology, 115102, vol. 31, No. 11, Aug. 25, 2020. (Abstract Only) https://doi.org/10.1088/1361-6501/ab9bb8.
Yu, Unsupervised Machine Learning Anomaly Detection for Multivariate Time-Series Data in Wind Turbine Converters, Theseus, May 2020, 63 Pages.
Zhang et al., A Data-Driven Design for Fault Detection of Wind Turbines Using Random Forests and XGboost, IEEE, Journals & Magazines, vol. 6, 2018, pp. 21020-21031. https://doi.org/10.1109/ACCESS.2018.2818678.

\* cited by examiner

SYSTEM AND METHOD FOR CYBERATTACK DETECTION IN A WIND TURBINE CONTROL SYSTEM

FIELD

The present disclosure relates generally to wind turbines and, more particularly, to systems and methods for detecting and isolating a cyberattack on a control system of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." Each of the individual wind turbines may be controlled via a turbine controller. Similarly, the overall wind farm may be controlled via a farm-level controller. Such controllers may also be connected to a network, either locally or via the Internet, such that the wind farm and the individual turbine controllers can be controlled online and in real-time. As the wind power business continues to increase in popularity, however, so too does the risk of cyberattack on the control systems thereof.

Moreover, wind turbines are dynamic systems operated under unknown and stochastic operation conditions (i.e., turbulent wind field). With a limited number of sensors available, developing a cyberattack detection and isolation system that can effectively and efficiently detect cyberattacks as well as pinpoint where the attack occurs becomes extremely challenging. For example, using a single detection model for an entire turbine unit results in a detection model that is overwhelmingly complex. As such, properly training such a complex model to cover a wide range of stochastic operation conditions is practically impossible (assuming the training samples are abundantly available).

Accordingly, the present disclosure is directed to improved systems and methods for detecting and isolating a cyberattack on a control system of a wind turbine that address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for detecting a cyberattack on a control system of a wind turbine. The method includes providing a plurality of classification models of the control system. The method also includes receiving, via each of the plurality of classification models, a time series of operating data from one or more monitoring nodes of the wind turbine. The method further includes extracting, via the plurality of classification models, a plurality of features using the time series of operating data. Each of the plurality of features, for example, is a mathematical characterization of the time series of operating data associated with the one or more monitoring nodes. Moreover, the method includes generating an output from each of the plurality of classification models. In addition, the method includes determining, using a decision fusion module, a probability of the cyberattack occurring on the control system based on a combination of each of the outputs. Thus, the method includes implementing a control action when the probability exceeds a probability threshold.

In an embodiment, the time series of operating data may include any one or more of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

In another embodiment, the plurality of features may include one or more estimated parameters characterizing at least one of a turbulent wind field or turbulence level and length scales. In such embodiments, the turbulent wind field may include at least one of a rotor-plane-averaged wind speed in 3D, rotor-plane-averaged wind direction in 3D, turbulent intensity in 3D, vertical and horizontal wind shear, and wind veer.

In an embodiment, the mathematical characterization may include, for example, a maximum, minimum, mean, standard deviation, variance, settling time, Fast Fourier Transform ("FFT") spectral components, linear and non-linear principal components, independent components, sparse coding, deep representation learning, or any other suitable mathematical characterization of the time series of operating data.

In further embodiments, each of the outputs may include, as an example, a scalar score representing the probability of the cyberattack occurring on the control system. Thus, in such embodiments, determining the probability of the cyberattack occurring on the control system based on the combination of each of the outputs may include identifying any of the scalar scores exceeding a score threshold and determining the probability of the cyberattack occurring on the control system based on the combination of each of the scalar scores.

In another embodiment, determining the probability of the cyberattack occurring on the control system based on the combination of each of the outputs may include integrating a plausibility of an estimated operating condition.

In additional embodiments, the method may include monitoring different components of the wind turbine or determining different cyberattacks occurring on the control system of the wind turbine or combinations thereof via each of the plurality of classification models.

In several embodiments, each of the plurality of classification models may include a machine learning algorithm. For example, in an embodiment, each of the machine learning algorithms may include a decision stump, an extreme learning machine, a convolutional neural network, or similar, or combinations thereof.

In particular embodiments, each of the plurality of classification models may be different types of models that receive the time series of operating data. In addition, or in the alternative, one or more of the plurality of classification models may include one or more interdependencies with each other, such as, for example, a shared node of the monitoring nodes, a shared feature of the plurality of features, or the scalar score of one or more of the plurality of classification models being used as a feature in another one of the plurality of classification models.

In an embodiment, the method may include training the plurality of classification models using data sets from the monitoring nodes of the wind turbine and/or training a coupled ensemble neural network.

In further embodiments, extracting, via the plurality of classification models, the plurality of features using the time series of operating data may include generating an overall feature vector from the plurality of features, the overall feature vector comprising interactive features of the plurality of features from two or more monitoring nodes, reducing a dimension of the overall feature vector using a dimensionality reduction technique, and calculating the plurality of features over a sliding window of the time series of operating data.

In yet another embodiment, the method may include determining a length and duration of the sliding window using domain knowledge, data inspection, and/or batch processing.

In certain embodiments, the method may include optimizing a type and number of the plurality of features for each of the one or more monitoring nodes using at least one of domain-knowledge, feature engineering, or receiver operating characteristic (ROC) statistics.

In further embodiments, the decision fusion module may include decision fusion module comprises at least one of a logic operator or a weighted average of the outputs or a machine learning algorithm that maps multiple decisions to a single output.

In another aspect, the present disclosure is directed to a system for detecting a cyberattack on a control system of a wind turbine. The system includes a controller having a plurality of classification models. The controller is configured to perform a plurality of operations, including but not limited to receiving, via each of the plurality of classification models, a time series of operating data from one or more monitoring nodes of the wind turbine, extracting, via the plurality of classification models, a plurality of features using the time series of operating data, each of the plurality of features being a mathematical characterization of the time series of operating data associated with the one or more monitoring nodes, generating an output from each of the plurality of classification models, determining, using a decision fusion module, a probability of the cyberattack occurring on the control system based on a combination of each of the outputs, and implementing a control action when the probability exceeds a probability threshold. It should be understood that the control system may include any one or more of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
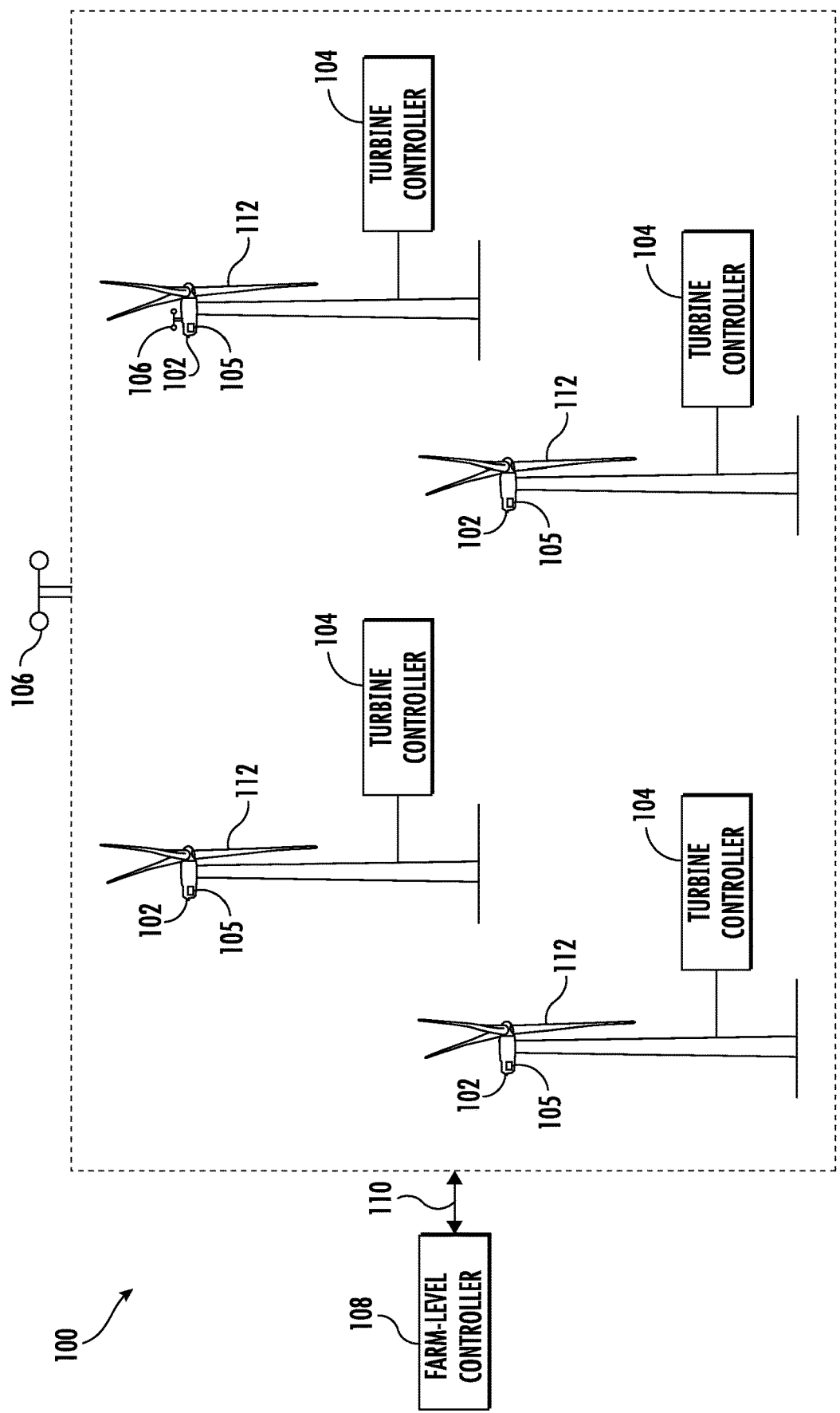
FIG. 1 illustrates a perspective view of one embodiment of a wind farm according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for detecting cyberattack and subsystem level isolation in wind turbines using an ensemble of anomaly detectors (also referred to herein as classification models). In particular, each anomaly detector may be a classification model that is trained using features extracted from a polarity of wind turbine monitoring nodes (e.g., sensors, actuators, controller parameters, etc.). Furthermore, the ensemble includes different machine learning-based classification methods, such as extreme learning machines and deep convolutional neural networks. In addition to subsystem level isolation, the ensemble of anomaly detectors is capable of providing a classification for attack types as well.

More particularly, in certain embodiments, ensemble learning may be a machine learning paradigm, which leverages a collection of diverse base learners (models) to achieve better prediction performance than that could be achieved by any individual base learner. For example, the system of the present disclosure includes an ensemble of classification models that each use a subset of wind turbine monitoring nodes. The monitoring nodes represent certain signals and/or measurements that are accessible directly from the wind turbine installment (e.g., measured generator speed or control output). Thus, in an embodiment, the system may include at least eight machine learning classification models trained on data sets from the monitoring nodes to either monitor specific components of the wind turbine, detect cyberattacks or both. Furthermore, each of the classification models can extract their own set of features from the node signals for high detection accuracy and representation of information diversity. The output of each classification model may be, for example, a scalar score representing the probability of a cyberattack. Observed score magnitudes above certain predetermined thresholds are configured to indicate a fault and/or an attack. The scores from all of the classification models can also be assimilated to determine whether an abnormality or cyberattack has been identified. Thus, the present disclosure provides for determining whether an aberration has taken place at a time when the abnormal signals exceed a certain threshold.

The present disclosure may also include a system and method for cyberattack detection on systems with unknown and stochastic operation. More specifically, in certain embodiments, an estimator can be used to estimate one or more operating conditions of the system, followed by a statistical analysis and database block to analyze the plausibility of the estimated operating condition(s). The plausibility analysis result can then be combined with the cyberattack detection algorithm(s) described herein, which use feature extraction and classification, to determine if the system is being attacked.

Thus, the present disclosure provides many advantages not present in the prior art. For example, the systems and methods of the present disclosure provide for anomaly detection (e.g., attacks or faults) in wind turbines and provide subsystem attack/fault isolation as well as type classification. More particularly, the present disclosure enables modeling of a complex system with multiple subsystems or components to not only achieve a higher detection performance, but also facilitate attack localization and classification.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 1 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure.

Figure 2:
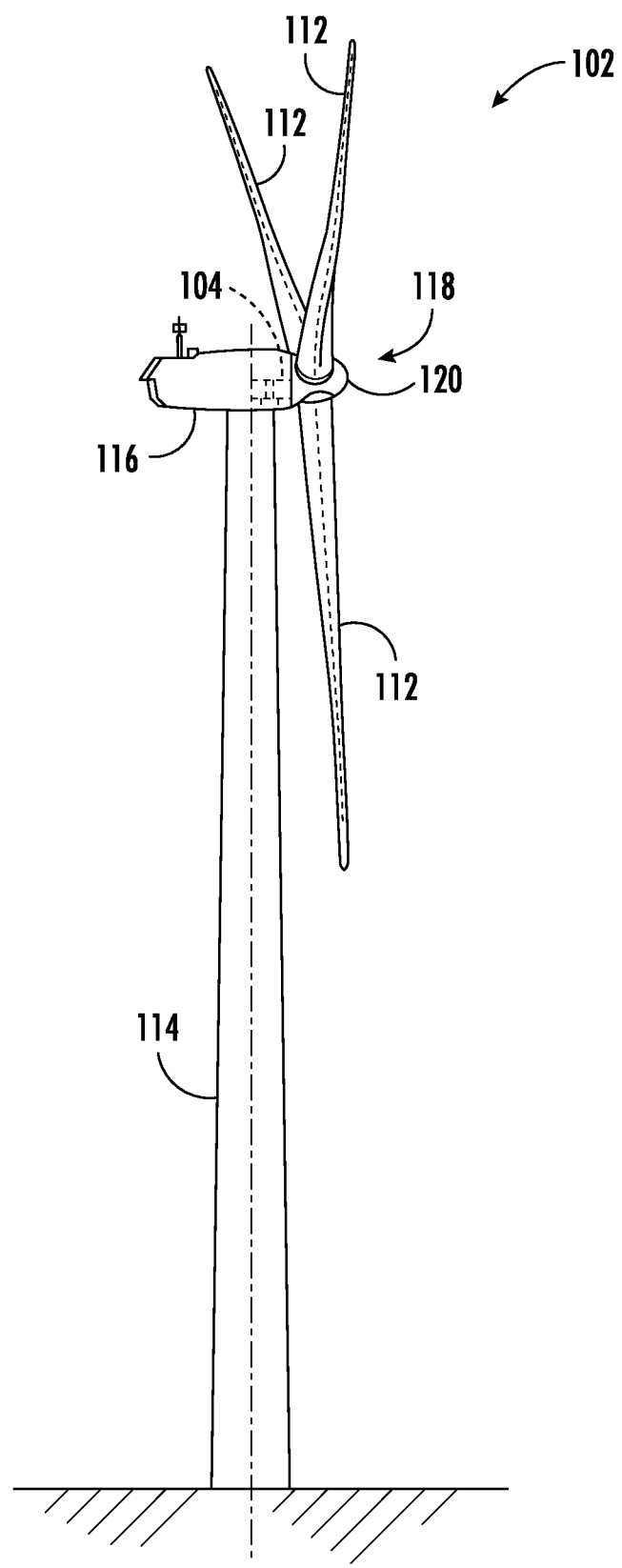
FIG. 2 illustrates a perspective view of one embodiment of a wind turbine according to the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm-level controller 108. Moreover, in one embodiment, the farm-level controller 108 may be coupled to the turbine controllers 104 through a network 110 to facilitate communication between the various wind farm components. The wind turbines 102 may also include one or more sensors 105, 106, 107 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors.

Figure 3:
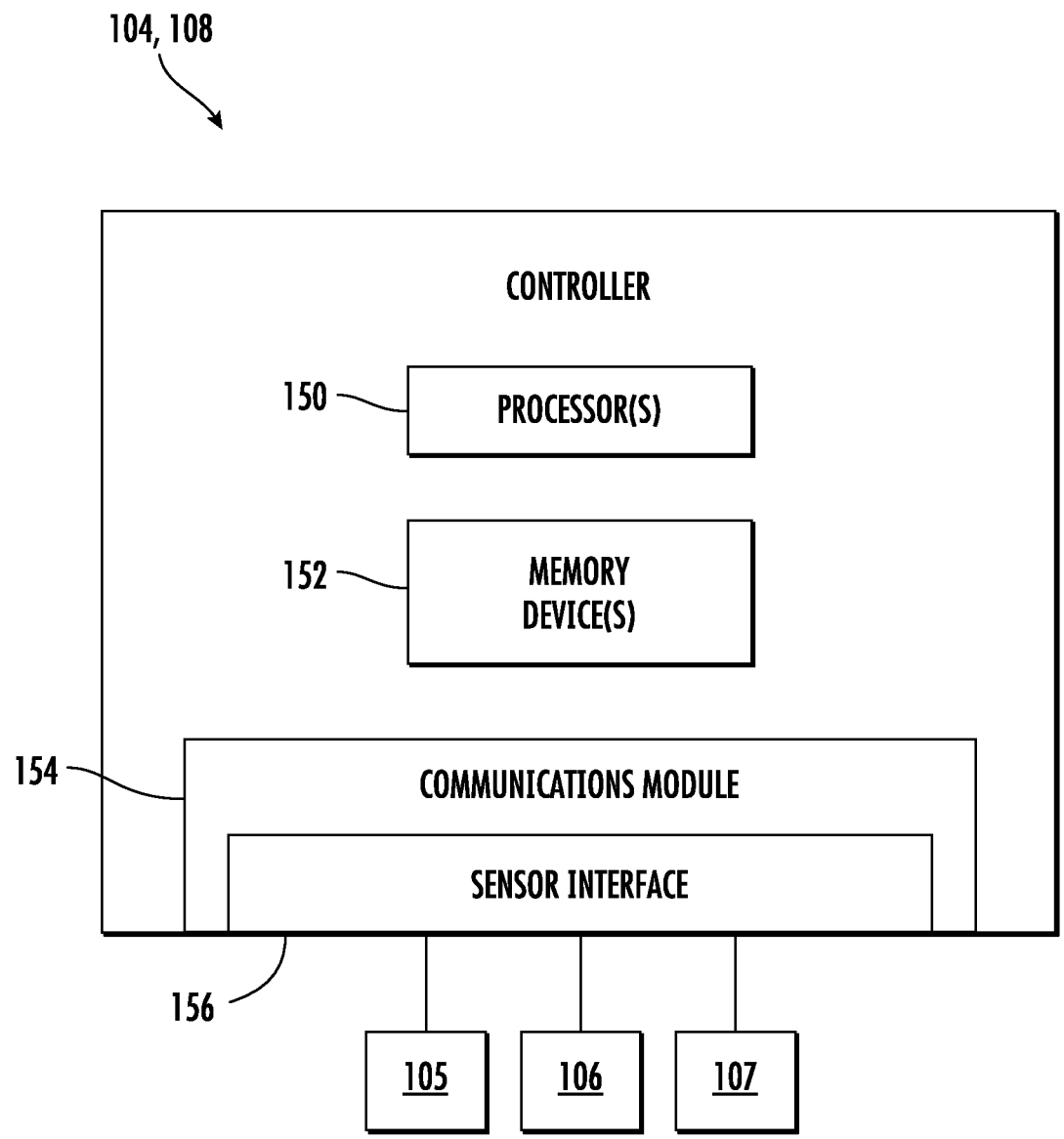
FIG. 3 illustrates a block diagram of one embodiment of a controller of a wind turbine and/or or wind farm according to the present disclosure.

Referring now to FIG. 3, there is illustrated a block diagram of one embodiment of suitable components that may be included within the farm-level controller 108, the turbine controller(s) 104, and/or other suitable controller according to the present disclosure. As shown, the controller(s) 104, 108 may include one or more processor(s) 150 and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106, 107 (such as the sensors described herein) to be converted into signals that can be understood and processed by the processors 150. It should be appreciated that the sensors 105, 106, 107 may be communicatively coupled to the communications module 154 using any suitable means. For example, as shown, the sensors 105, 106, 107 are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm-level controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm-level controller 108 in near real time and/or online. Moreover, in an embodiment, the network 110 may include the Internet and/or cloud computing. Accordingly, the controller(s) 104, 108 may be susceptible to various cyberattacks.

Figure 4:
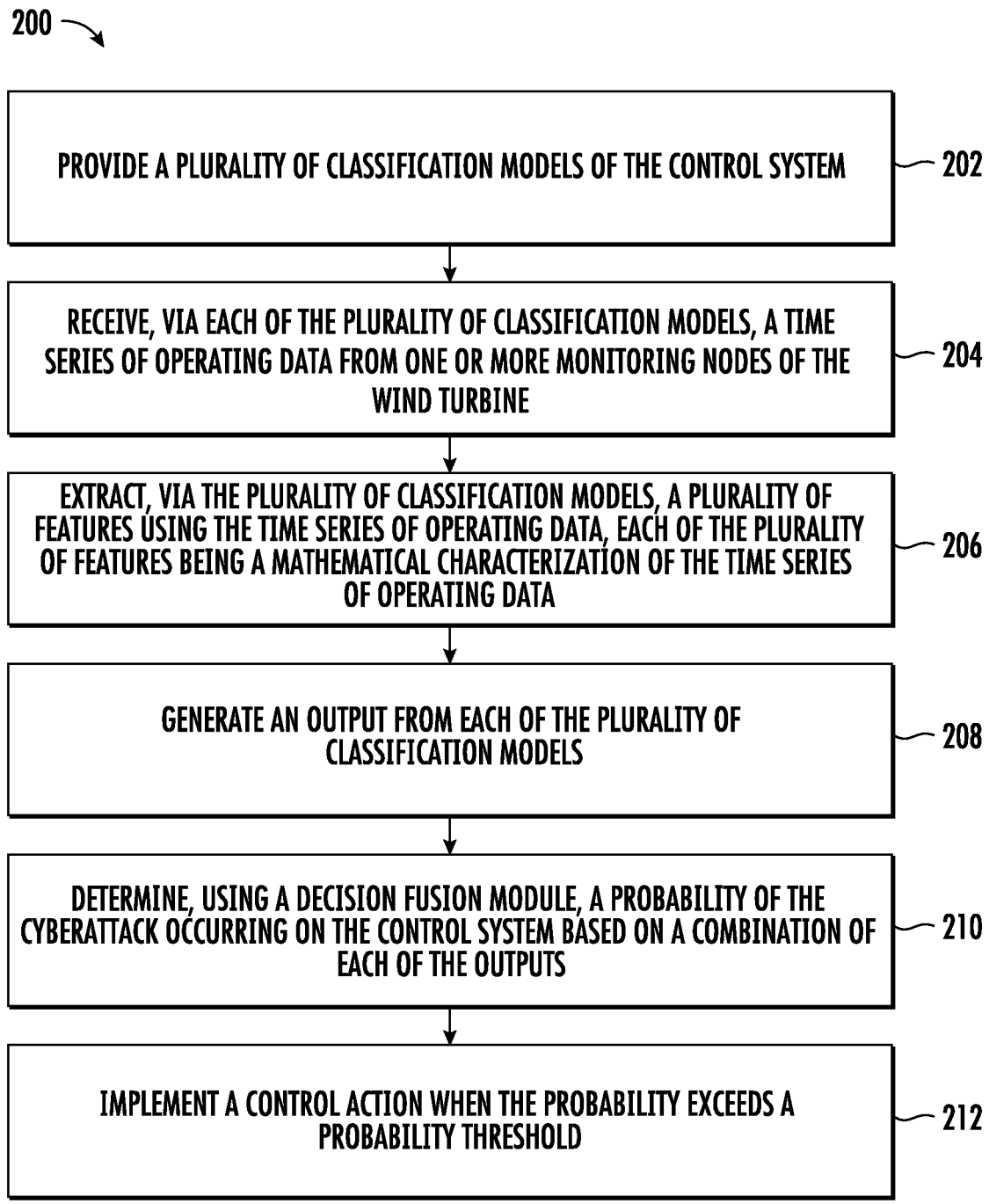
FIG. 4 illustrates a flow diagram of one embodiment of a method for detecting a cyberattack on a control system of a wind turbine according to the present disclosure.
Figure 5:
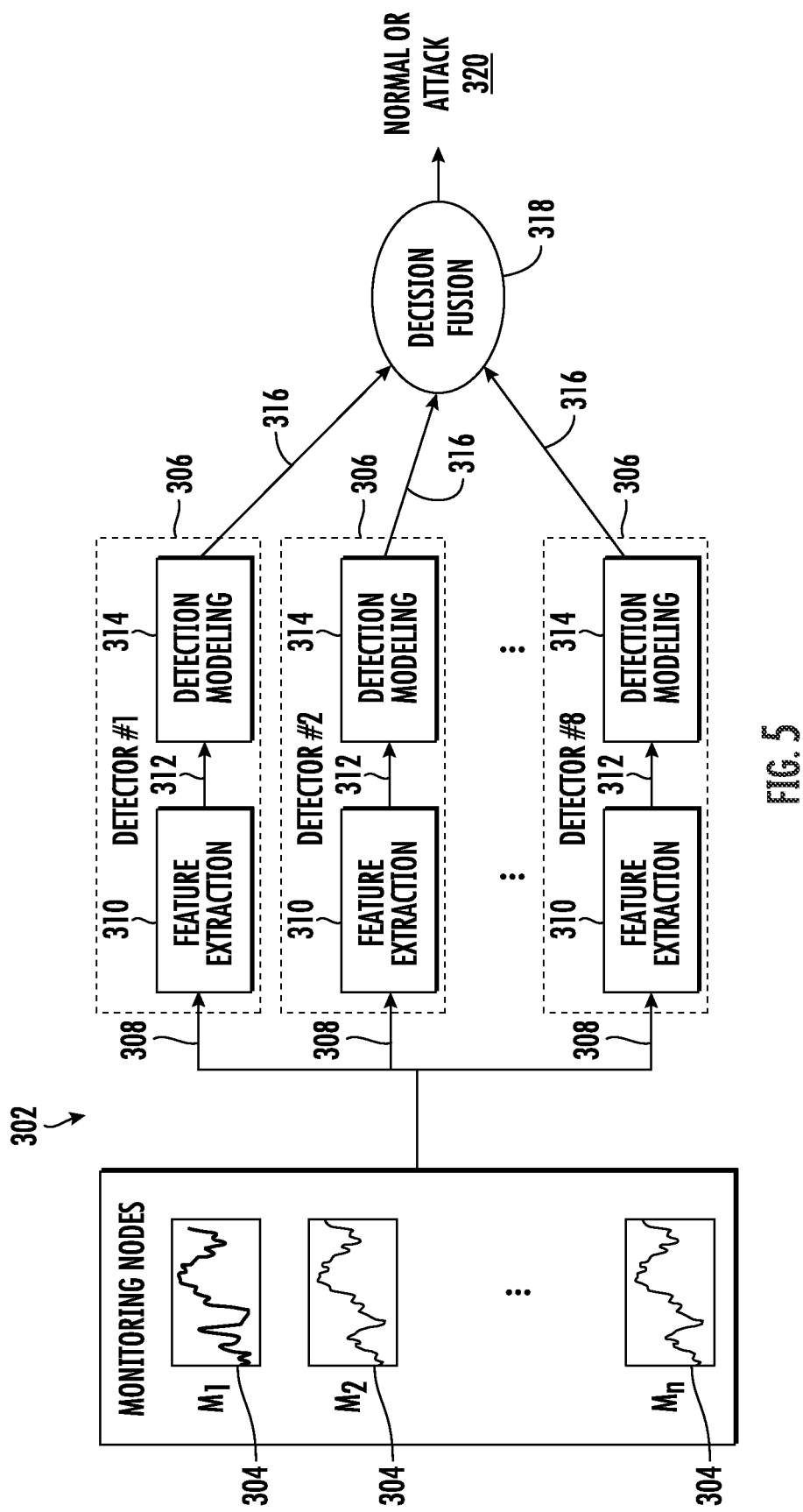
FIG. 5 illustrates a schematic diagram of one embodiment of a system for detecting a cyberattack on a control system of a wind turbine according to the present disclosure.

Thus, referring now to FIGS. 4 and 5, a method 200 and system 300 for detecting a cyberattack on a control system of a wind turbine, such as one of the wind turbines 102 in the wind farm 100, are illustrated. More specifically, FIG. 4 illustrates a flow diagram of a method 200 for detecting a cyberattack on a control system of a wind turbine according to the present disclosure, whereas FIG. 5 illustrates a schematic diagram of a system 300 for detecting a cyberattack on a control system of a wind turbine according to the present disclosure. In general, as shown in FIG. 4, the method 200 is described herein as implemented for cyberattack detection for the wind turbine(s) 102 and/or the wind farm 100 described above. However, it should be appreciated that the disclosed method 200 may be used to detect cyberattacks for any other wind turbine(s) and/or wind farm having any suitable configuration. Further, it should be understood that the controller configured to implement the methods described herein may be the farm-level controller 108, one or more of the turbine controllers 104, and/or any other suitable controller located within the wind farm 100 or remote from the wind farm 100. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes providing a plurality of classification models 306 of the control system. In several embodiments, for example, each of the plurality of classification models 306 may include a machine learning algorithm. For example, in an embodiment, each of the machine learning algorithms may include a decision stump, an extreme learning machine, a convolutional neural network, or similar, or combinations thereof. As used herein, a decision stump generally refers to a machine learning algorithm that makes a prediction based on the value of just a single input feature. An extreme learning machine generally refers to a feedforward neural networks for classification, regression, clustering, sparse approximation, compression and feature learning with a single layer or multiple layers of hidden nodes, where the parameters of the hidden nodes (not just the weights connecting inputs to the hidden nodes) need not be tuned. A convolutional neural network generally refers to a class of deep neural networks, most commonly applied to analyzing visual imagery.

In further embodiments, the classification models 306 may include any suitable modeling algorithm or process, such as stepwise linear regression. Generally, stepwise linear regression adds or removes features one at a time in an attempt to get the best regression model without over fitting. Further, stepwise regression typically has two variants, including forward and backward regression. For example, forward stepwise regression is a step-by-step process of building a model by successive addition of predictor variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling a response variable.

The classification models 306 may also include an absolute shrinkage and selection operator (LASSO) algorithm or a M5 Prime (M5P) algorithm. Generally, a LASSO algorithm minimizes the residual sum of squares subject to a constraint that the sum of the absolute value of the coefficients is smaller than a constant. A M5 Prime (M5P) algorithm generally refers to a tree-based regression algorithm that is effective in many domains. For example, whereas stepwise linear regression produces a single global linear model for the data, tree based regression algorithms perform logical tests on features to form a tree structure. Generally, the M5P algorithm utilizes a linear regression model at each node of the tree, providing more specialized models. Still other machine learning methods may be utilized, such as Gaussian Process Models, Random Forest Models, Support Vector Machines, and/or a micro-service.

In addition, in particular embodiments, the number of the classification models 306 may be designed for monitoring different components of the wind turbine(s) 102, detecting different types of cyberattacks, or a combination of two. Accordingly, each of the classification models 306 may have a physical connection with a different component of the wind turbine 102 to enable cyberattack isolation of a particular component. Further, as will be described herein, the method 200 may include integrating the outputs of the individual classification models 306.

For example, as shown in FIG. 5, a schematic diagram of one embodiment of the system 300 for detecting a cyberattack on a control system of a wind turbine according to the present disclosure is illustrated. More specifically, as shown in FIG. 5, the system 300 may include a control system 302 (such as one of the turbine controllers 104 or the farm-level controller 108) that includes a plurality of monitoring nodes 304 and a plurality of the classification models 306. In such embodiments, the monitoring nodes 304 used in each ensemble (i.e., each subsystem) can be selected using knowledge-based or data-driven based techniques. Moreover, as shown, the system 300 may include any suitable number of classification models 306. For example, the illustrated system 300 includes eight individual models. In further embodiments, the system 300 may include any suitable number of classification models, including more than eight models or less than eight models.

Thus, referring back to FIG. 4, as shown at (204), the method 200 includes receiving, via each of the plurality of classification models 306, a time series of operating data 308 from one or more of the monitoring nodes 304 of the wind turbine 102. In an embodiment, for example, the time series of operating data 308 may include any one or more of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

In further embodiments, each of the plurality of classification models 306 may have different features and/or different types of models, which provides the adequate diversity required for achieving higher detection accuracy and robustness of the ensemble model. In addition, or in the alternative, one or more of the plurality of classification models 306 may include one or more interdependencies with each other, such as, for example, a shared node of the monitoring nodes, a shared feature of the plurality of features, or the scalar score of one or more of the plurality of classification models being used as a feature in another one of the plurality of classification models 306.

In yet another embodiment, the method 200 may also include training the plurality of classification models 306 using data sets from the monitoring nodes 304 of the wind turbine(s) 102 and/or training a coupled ensemble neural network. For example, in an embodiment, the interactions among the models can be trained using techniques such as coupled ensembles of deep neural networks. A deep coupled ensemble neural network may be learned using either supervised or semi-supervised methods depending on the availability of data.

For example, in an embodiment, the control system 302 may be configured to continuously train the classification models 306 using a human annotator. As used herein, annotation (e.g., annotated analytics) in machine learning generally refers to a process of labelling data in a manner that can be recognized by machines or computers. Furthermore, such annotation can be completed manually by humans as human annotators generally better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning or clustering, as well as any other suitable accurate labeling process.

Accordingly, referring still to FIG. 4, as shown at (206), the method 200 includes extracting, via the plurality of classification models 306, a plurality of features 312 using the time series of operating data 308. For example, in an embodiment, as shown in FIG. 5, the system 300 includes a plurality of feature extraction modules 310 that receive the time series of operating data 308 from a collection of monitoring nodes 304 (e.g., sensors, actuators, controller nodes, etc.), and extracts features 312 from the time series data for each monitoring node 304. For example, in an embodiment, each of the feature extraction modules 310 is configured to extract one or more features using the time series data from either a single monitoring node 304 or a collection of the monitoring nodes 304. As used herein, the term "feature" generally refers to, for example, mathematical characterizations or representations of the time series of operating data. Such mathematical characterizations may include, for example, a maximum, minimum, mean, standard deviation, variance, settling time, Fast Fourier Transform ("FFT") spectral components, linear and non-linear principal components, independent components, sparse coding, deep representation learning, or any other suitable mathematical characterization of the time series of operating data. Moreover, the term "feature" may also refer to a mathematical characterization or representation of physics, engineering knowledge, and/or control logic, e.g., based on one or more of the monitoring nodes 304.

In further embodiments, the system 300 may also include a plurality of detection modeling modules 314 configured to receive the extracted features 312. Such detection modeling modules 314 can thus assist with choosing a proper feature subset from an overall feature vector from the plurality of features 312. In such embodiments, the overall feature vector may contain interactive features 312 from two or more monitoring nodes 304, e.g., cross-correlation between two nodes. As such, the method 200 may also include normalizing the features 312 and/or reducing a dimension of the overall feature vector using a dimensionality reduction technique, such as principal component analysis. Furthermore, in an embodiment, the method 200 may include calculating the plurality of features 312 over a sliding window of the time series of operating data 308. In yet another embodiment, the method 200 may include determining a length and/or duration of the sliding window using domain knowledge, data inspection, and/or batch processing.

In further embodiments, the method 200 may also include optimizing a type and/or number of the plurality of features 312 for each of the one or more monitoring nodes 304 using at least one of domain-knowledge, feature engineering, or receiver operating characteristic (ROC) statistics.

Details of one embodiment of an example system are summarized in Table 1 below, including the number of classification models 306, the extracted features 310, and the type of detection model.

| Model ID | Extracted Features | Detection Model |
| --- | --- | --- |
| Detector #1 | Maximum absolute differences between setpoint and delayed measured pitch angles | DS |
| Detector #2 | Maximum absolute residuals between measured proximity 1 (e.g., from one or more proximity sensors) and predicted proximity 1 and between measured proximity 2 (e.g., from one or more proximity sensors) and predicted proximity 2 | DS |
| Detector #3 | Correlations of estimated wind acceleration with fore/aft pitch feedback and side/side torque feedback, respectively, maximum of estimated tower-head ore/aft speed, max. of estimated tower-head side/side speed, median of estimated wind speed, and standard deviation of estimated wind speed | ELM |
| Detector #4 | Calculated power, product of generator speed and torque, and squared product of generator speed and torque | CNN |
| Detector #5 | Calculated azimuth angle, measured generator speed | CNN |
| Detector #6 | Spectrum magnitudes at tower fore-aft, blade_Flap, and blade_Edge frequencies, respectively | CNN |
| Detector #7 | Spectrum mags at tower fore-aft, blade_Flap, and blade_Edge frequencies, respectively, calculated on difference between setpoint and delayed measured pitch angles | DS |
| Detector #8 | Spectrum mags at tower fore-aft, blade_Flap, and blade_Edge frequencies, respectively, calculated on residuals between measured proximity 1 and predicted proximity 1 and between proximity 2 and predicted proximity 2 | DS |

Where DS refers to decision stump, ELM refers to extreme learning machine, and CNN refers to convolutional neural network.

Referring still to FIG. 4, as shown at (208), the method 200 includes generating an output 316 from each of the plurality of classification models 306. In certain embodiments, for example, as shown in FIG. 5, each of the outputs 316 may include a scalar score representing the probability of the cyberattack occurring on the control system 302. Thus, as shown at (210), the method 200 includes determining, using a decision fusion module 318, a probability of the cyberattack occurring on the control system 302 based on a combination of each of the outputs 316. For example, in particular embodiments, the decision fusion module 318 is configured to determine the probability of the cyberattack by identifying any of the scalar scores exceeding a score threshold and determining the probability of the cyberattack occurring on the control system 302 based on the combination of each of the scalar scores.

In such embodiments, the decision fusion module 318 described herein may include a machine learning algorithm (e.g., a machine-learning based model trained using labeled data) or a weighted average of the outputs (e.g., a weighted average of the scalar scores compared to the score threshold. Accordingly, the decision fusion module 318, similar to the classification models 306, may also be trained. In further embodiments, decision fusion module 318 may also include a logical operation, a soft combination of the probabilistic score, or another trained classification model. In other words, the control system 302 may include any suitable supervised machine learning algorithm that can apply what has been learned in the past to new data using labeled data to predict future decisions. Starting from the model build, the learning algorithm produces an inferred function to make predictions about the output values. As such, the control system 302 is able to provide targets for any new input after sufficient training. The learning algorithm can also compare its output with the correct, intended output and find errors in order to modify the model accordingly.

Referring back to FIG. 4, as shown at (222), the method 200 further includes implementing a control action when the probability of a cyberattack exceeds a probability threshold. For example, as shown in FIG. 5, the output 320 of the decision fusion module is configured to indicate whether operation is normal or whether a cyberattack has occurred.

Accordingly, in such embodiments, for example, the control action may include generating an alarm. It should be understood that the control action as described herein may further encompass any suitable command or constraint by the control system 302, For example, in several embodiments, the control action may include temporarily de-rating or up-rating the wind turbine 102.

Up-rating or de-rating the wind turbine 102 may include speed up-rating or de-rating, torque up-rating or de-rating or a combination of both. Further, as mentioned, the wind turbine 102 may be uprated or de-rated by pitching one or more of the rotor blades 112 about its pitch axis. The wind turbine 102 may also be temporarily up-rated or de-rated by yawing the nacelle 116 to change the angle of the nacelle 116 relative to the direction of the wind. In further embodiments, the controller(s) 104, 108 may be configured to actuate one or more mechanical brake(s) in order to reduce the rotational speed of the rotor blades 112. In still further embodiments, the controller(s) 104, 108 may be configured to perform any appropriate control action known in the art. Further, the controller(s) 104, 108 may implement a combination of two or more control actions.

Figure 6:
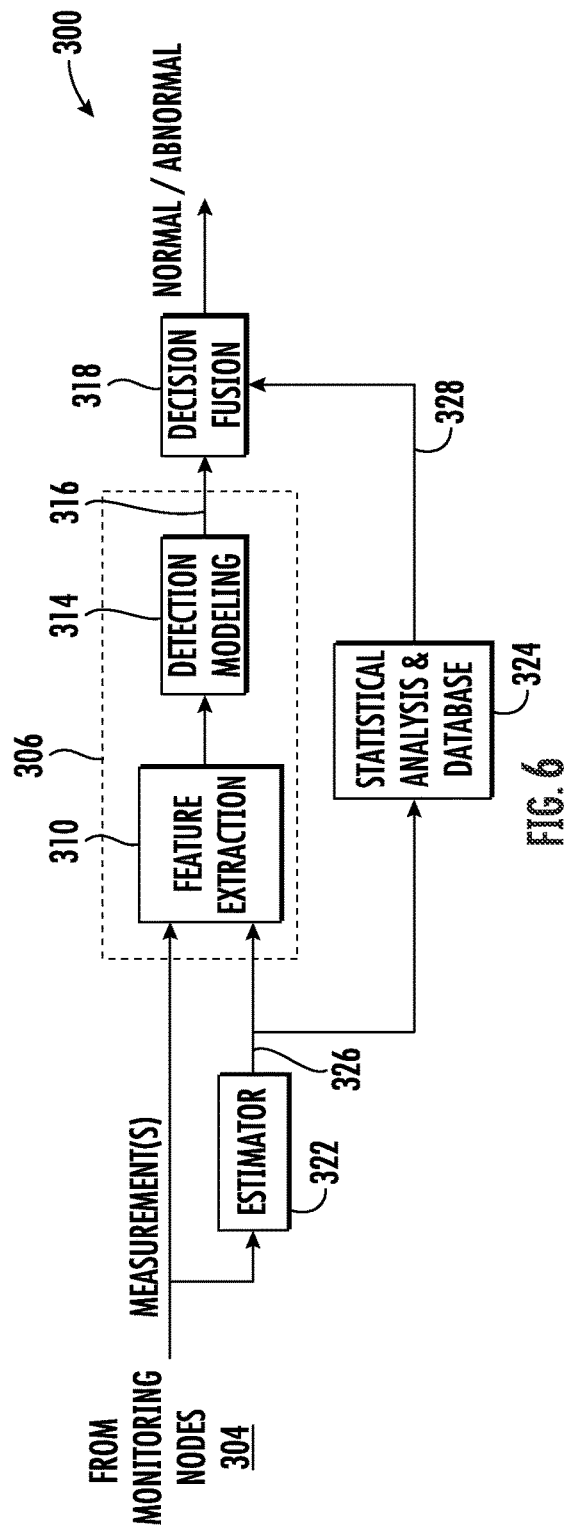
FIG. 6 illustrates a schematic diagram of another embodiment of a system for detecting a cyberattack on a control system of a wind turbine according to the present disclosure.

Referring now to FIG. 6, a schematic diagram of another embodiment of the system 300 for detecting a cyberattack on a control system of a wind turbine according to the present disclosure illustrated. In particular, as shown, the cyberattack detection architecture includes the classification model(s) 306 having the feature extraction module 310 and the detection modeling module 314 as described herein, as well as additional function blocks (e.g., such as an estimator module 322 and a statistical analysis module 324 and database) that can be integrated with the decision fusion module 318.

Thus, in such embodiments, and as shown in FIG. 6, the estimator module 322 is configured to estimate unknown and/or stochastic operating conditions of the system 300. For example, for the wind turbine(s) 102, the estimator module 322 may estimate certain key parameters to characterize the turbulent wind field (e.g., rotor plane averaged wind speed in 3D, rotor plane averaged wind direction in 3D, turbulent intensity in 3D, vertical and horizontal wind shear, wind veer, etc.). Furthermore, the estimator module 322 may use spectral estimation methods to estimate stochastic wind parameters such as turbulence level and turbulence length scales. As such, in certain embodiments, the estimator module 322 is configured to fit the parameters into a standard stochastic wind model, such as a Kaimal spectral model, a von Karman spectrum distribution, or a data-driven model using techniques such as Autoregressive Moving Average (ARMA) or Autoregressive Integrated Moving Average (ARIMA) modeling. In further embodiments, the estimator module 322 can be derived from first principle in a model-based manner, or can be derived from a data-driven approach using regression or machine learning. Thus, as shown, an output 326 of the estimator module 322 can be fed into both the feature extraction module 310 and/or the statistical analysis module 324 and database.

Still referring to FIG. 6, the statistical analysis module 324 and database is configured to analyze the plausibility of the output 326 (i.e., the estimated operating condition) from the estimator module 322. Accordingly, in such embodiments, the statistical analysis module 324 and database can be implemented by analyzing the amplitude, frequency, and phase of the estimated operating condition using time-frequency analysis technique, by comparing the estimated operating condition with the historical data from the database, or by using a probabilistic model with prior distribution to calculate the posterior distribution. As such, the statistical analysis module 324 and database assists with cyberattack detection with unknown and estimated operating conditions by generating the plausibility of the operating condition(s) (represented as output 328). For example, in certain instances, several critical attacks on the wind turbine(s) 102 cannot be detected by analyzing the consistency of the measured signals using the system 300 of FIG. 5 because it is possible to construct a wind field that is consistent with all measurements, which makes the attacked data appear normal. Thus, the statistical analysis module 324 and database does not treat the constructed wind field as granted, but rather questions the plausibility of the constructed wind field based on multiple factors, including historical probability distribution or prior domain knowledge of the field.

Another benefit of using the statistical analysis module 324 and database is to allow quick adaption when the cyberattack detection module is deployed to a large number of heterogeneous assets. For example, the wind turbine(s) 102 in a single wind farm can experience different external wind conditions due to the difference of their relative location. Without the estimator module 322 and the statistical analysis module 324 and database, the system 300 needs to train the classification model(s) 306 for each wind turbine 102 individually. However, by using the proposed architecture, each wind turbine 102 can compare the estimated wind condition with the historical data collected individually, which allows turbine-wise adaption of the cyberattack detection algorithm.

Thus, in such embodiments, as shown in FIG. 6, the decision fusion module 318 is configured to blend the plausibility of the operating condition(s) (e.g., output 328) with the output(s) 316 from the classification models 306 to determine if the system 300 is being attacked.

Figure 7:
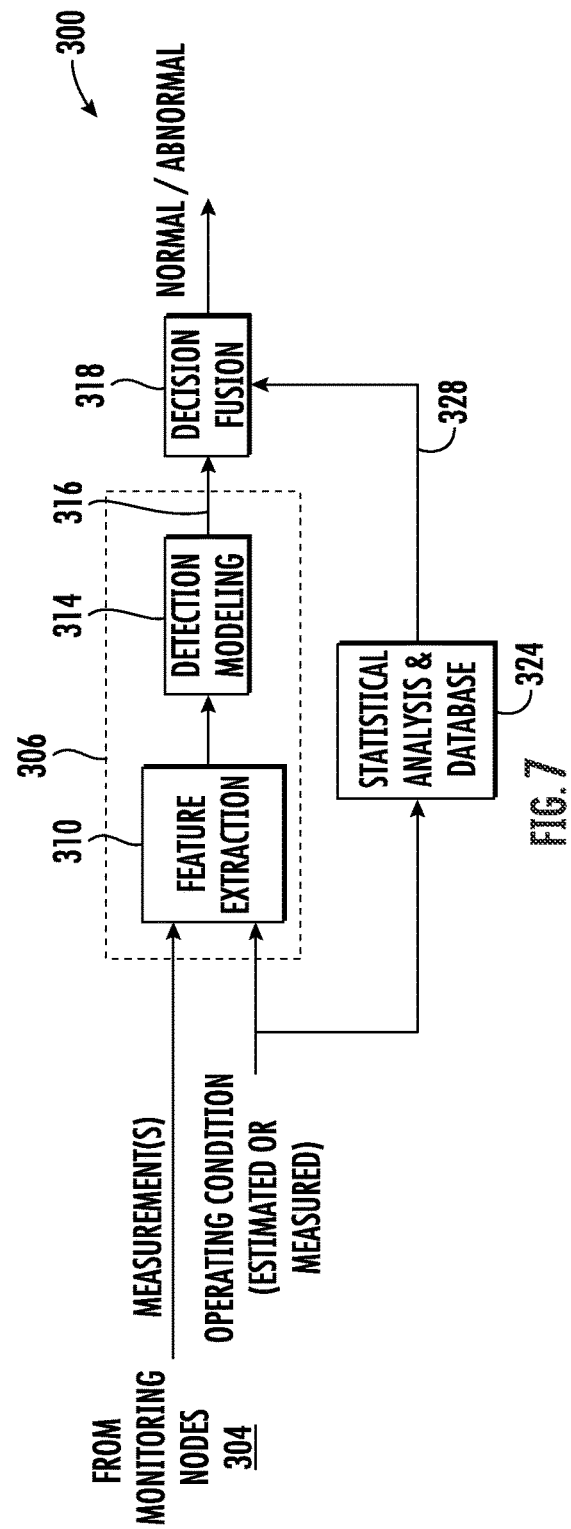
FIG. 7 illustrates a schematic diagram of still another embodiment of a system for detecting a cyberattack on a control system of a wind turbine according to the present disclosure.
Figure 8:
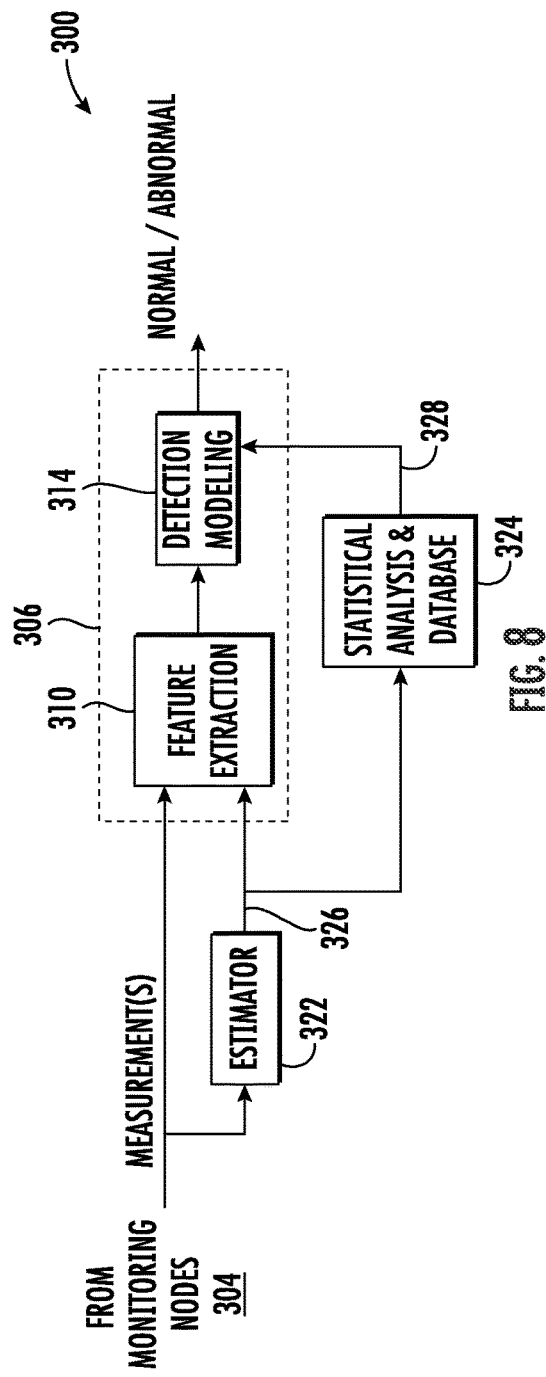
FIG. 8 illustrates a schematic diagram of yet another embodiment of a system for detecting a cyberattack on a control system of a wind turbine according to the present disclosure.
Figure 9:
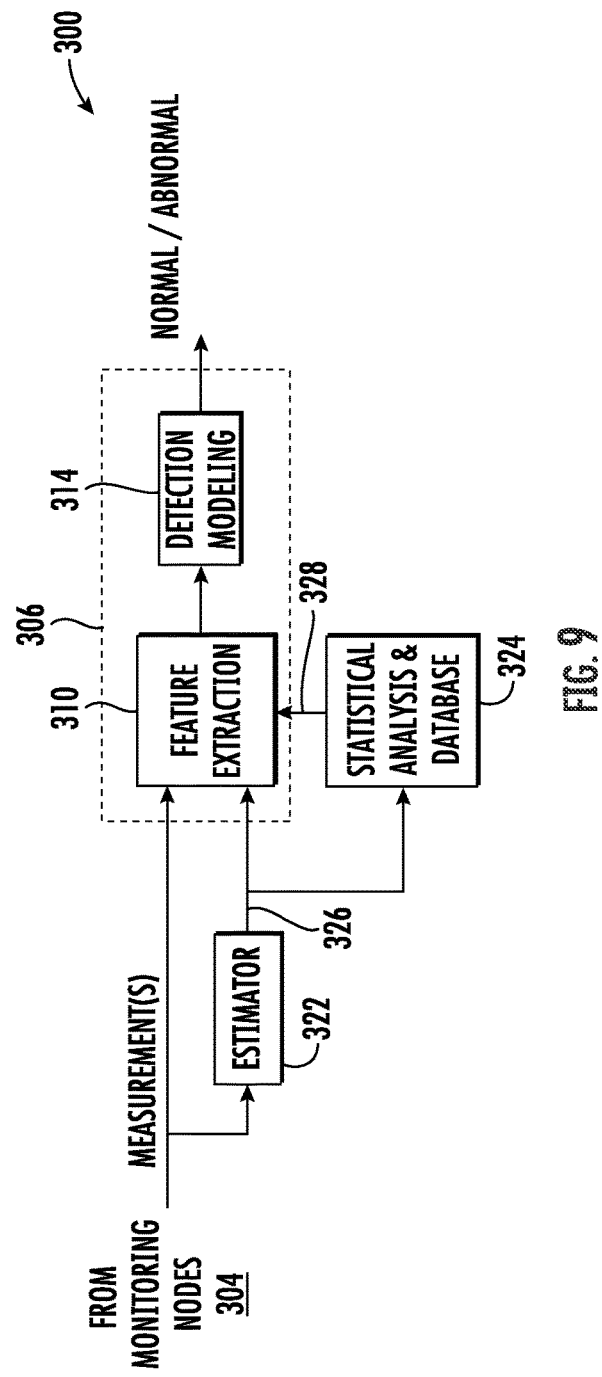
FIG. 9 illustrates a schematic diagram of a further embodiment of a system for detecting a cyberattack on a control system of a wind turbine according to the present disclosure.

Referring now to FIGS. 7-9, further variations of the system 300 described herein are illustrated. In particular, as shown in FIG. 7, the estimator module 322 may be omitted and an alternative measurement devices may be utilized (e.g., LiDAR for wind field measurements or similar). In still another embodiment, as shown in FIG. 8, the output 328 of the statistical analysis module 324 and database can be treated as a feature and fed into the classification models 306, e.g., instead of the fusion algorithm module 318. In yet another embodiment, as shown in FIG. 9, the output 328 of the statistical analysis module 324 can be treated as a measurement and fed into the feature extraction module 310. It should be understood that any combination of the aforementioned embodiments may also be utilized. For example, the output 328 of the statistical analysis module 324 and database can be used by any of the feature extraction module 310, the classification models 306 and/or the classifier, and/or the fusion algorithm module 318 simultaneously.

Various aspects and embodiments of the present invention are defined by the following numbered clauses:

Clause 1. A method for detecting a cyberattack on a control system of a wind turbine, the method comprising:
providing a plurality of classification models of the control system;
receiving, via each of the plurality of classification models, a time series of operating data from one or more monitoring nodes of the wind turbine;
extracting, via the plurality of classification models, a plurality of features using the time series of operating data, each of the plurality of features being a mathematical characterization of the time series of operating data;
generating an output from each of the plurality of classification models;
determining, using a decision fusion module, a probability of the cyberattack occurring on the control system based on a combination of each of the outputs; and, implementing a control action when the probability exceeds a probability threshold.

Clause 2. The method of any of the preceding clauses, wherein the time series of operating data comprises at least one of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

Clause 3. The method of any of the preceding clauses, wherein the plurality of features comprises one or more estimated parameters characterizing at least one of a turbulent wind field or turbulence level and length scales, where the turbulent wind field comprises at least one of a rotor-plane-averaged wind speed in 3D, rotor-plane-averaged wind direction in 3D, turbulent intensity in 3D, vertical and horizontal wind shear, and wind veer.

Clause 4. The method of any of the preceding clauses, wherein the mathematical characterization comprises at least one of maximum, minimum, mean, standard deviation, variance, settling time, Fast Fourier Transform ("FFT") spectral components, linear and non-linear principal components, independent components, sparse coding, or deep representation learning.

Clause 5. The method of any of the preceding clauses, wherein each of the outputs comprises a scalar score representing the probability of the cyberattack occurring on the control system, and wherein determining the probability of the cyberattack occurring on the control system based on the combination of each of the outputs further comprises:
identifying any of the scalar scores exceeding a score threshold; and
determining the probability of the cyberattack occurring on the control system based on the combination of each of the scalar scores.

Clause 6. The method of any of the preceding clauses, wherein determining the probability of the cyberattack occurring on the control system based on the combination of each of the outputs further comprises integrating a plausibility of an estimated operating condition.

Clause 7. The method of any of the preceding clauses, further comprising monitoring different components of the wind turbine or determining different cyberattacks occurring on the control system of the wind turbine or combinations thereof via each of the plurality of classification models.

Clause 8. The method of any of the preceding clauses, wherein each of the plurality of classification models comprises a machine learning algorithm, wherein each of the machine learning algorithms comprise one or more of a decision stump, an extreme learning machine, and a convolutional neural network.

Clause 9. The method of any of the preceding clauses, wherein each of the plurality of classification models are different types of models that receive the time series of operating data.

Clause 10. The method of any of the preceding clauses, wherein one or more of the plurality of classification models comprise one or more interdependencies with each other, the one or more interdependencies comprising at least one of a shared node of the monitoring nodes, a shared feature of the plurality of features, or the scalar score of one or more of the plurality of classification models being used as a feature in another one of the plurality of classification models.

Clause 11. The method of any of the preceding clauses further comprising training the plurality of classification models using at least one of data sets from the monitoring nodes of the wind turbine or training a single coupled ensemble neural network.

Clause 12. The method of any of the preceding clauses, wherein extracting, via the plurality of classification models, the plurality of features using the time series of operating data further comprises:
calculating the plurality of features over a sliding window of the time series of operating data;
generating an overall feature vector from the plurality of features, the overall feature vector comprising interactive features of the plurality of features from two or more monitoring nodes; and
reducing a dimension of the overall feature vector using a dimensionality reduction technique.

Clause 13. The method of any of the preceding clauses, further comprising determining a length and duration of the sliding window using at least one of domain knowledge, data inspection, or batch processing.

Clause 14. The method of any of the preceding clauses, further comprising optimizing a type and number of the plurality of features for each of the one or more monitoring nodes using at least one of domain-knowledge, feature engineering, or receiver operating characteristic (ROC) statistics.

Clause 15. The method of any of the preceding clauses, wherein the decision fusion module comprises at least one of a logic operator or a weighted average of the outputs or a machine learning algorithm that maps multiple decisions to a single output.

Clause 16. A system for detecting a cyberattack on a control system of a wind turbine, the system comprising:
a controller comprising a plurality of classification models, the controller configured to perform a plurality of operations, the plurality of operations comprising:
receiving, via each of the plurality of classification models, a time series of operating data from one or more monitoring nodes of the wind turbine;
extracting, via the plurality of classification models, a plurality of features using the time series of operating data, each of the plurality of features being a mathematical characterization of the time series of operating data;
generating an output from each of the plurality of classification models;
determining, using a decision fusion module, a probability of the cyberattack occurring on the control system based on a combination of each of the outputs; and,
implementing a control action when the probability exceeds a probability threshold.

Clause 17. The system of clause 16, wherein the time series of operating data comprises at least one of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

Clause 18. The system of clauses 16-17, wherein the mathematical characterization comprises at least one of maximum, minimum, mean, standard deviation, variance, settling time, Fast Fourier Transform ("FFT") spectral components, linear and non-linear principal components, independent components, sparse coding, or deep representation learning.

Clause 19. The system of clauses 16-18, wherein each of the outputs comprises a scalar score representing the probability of the cyberattack occurring on the control system.

Clause 20. The system of clauses 16-19, wherein determining the probability of the cyberattack occurring on the control system based on the combination of each of the outputs further comprises:
identifying any of the scalar scores exceeding a score threshold; and
determining the probability of the cyberattack occurring on the control system based on the combination of each of the scalar scores.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting a cyberattack on a control system of a wind turbine, the method comprising:
providing a plurality of classification models of the control system, each of the plurality of classification models comprising a base machine learning model and having a physical connection with a respective component of the wind turbine;
receiving, via each of the base machine learning models of each of the plurality of classification models, a time series of operating data from one or more monitoring nodes of the wind turbine;
extracting, via each of the base machine learning models of each of the plurality of classification models, a plurality of features using the time series of operating data, each of the plurality of features being a mathematical characterization of the time series of operating data; generating an output from each of the base machine learning models of the plurality of classification models;
receiving, via a decision fusion module, the outputs from each of the base machine learning models of the plurality of classification models, the decision fusion module comprising an integrated machine learning model;
determining, via the integrated machine learning model of the decision fusion module, a probability of the cyberattack occurring on the control system based on a combination of each of the outputs; and
implementing a control action when the probability of the cyberattack exceeds a probability threshold, wherein the control action comprises isolating the cyberattack by disconnecting the physical connection associated with the respective component experiencing the cyberattack.

2. The method of claim 1, wherein the time series of operating data comprises at least one of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

3. The method of claim 1, wherein the plurality of features comprises one or more estimated parameters characterizing at least one of a turbulent wind field or turbulence level and length scales, where the turbulent wind field comprises at least one of a rotor-plane-averaged wind speed in 3D, rotor-plane-averaged wind direction in 3D, turbulent intensity in 3D, vertical and horizontal wind shear, and wind veer.

4. The method of claim 1, wherein the mathematical characterization comprises at least one of maximum, minimum, mean, standard deviation, variance, settling time, Fast Fourier Transform ("FFT") spectral components, linear and non-linear principal components, independent components, sparse coding, or deep representation learning.

5. The method of claim 1, wherein each of the outputs comprises a scalar score representing the probability of the cyberattack occurring on the control system, and wherein determining the probability of the cyberattack occurring on the control system based on the combination of each of the outputs further comprises:
identifying any of the scalar scores exceeding a score threshold; and
determining the probability of the cyberattack occurring on the control system based on the combination of each of the scalar scores.

6. The method of claim 1, wherein determining the probability of the cyberattack occurring on the control system based on the combination of each of the outputs further comprises integrating a plausibility of an estimated operating condition.

7. The method of claim 1, further comprising monitoring different components of the wind turbine or determining different cyberattacks occurring on the control system of the wind turbine or combinations thereof via each of the plurality of classification models.

8. The method of claim 1, wherein each of the machine learning algorithms comprise one or more of a decision stump, an extreme learning machine, and a convolutional neural network.

9. The method of claim 1, wherein each of the plurality of classification models are different types of models that receive the time series of operating data.

10. The method of claim 5, wherein one or more of the plurality of classification models comprise one or more interdependencies with each other, the one or more interdependencies comprising at least one of a shared node of the monitoring nodes, a shared feature of the plurality of features, or the scalar score of one or more of the plurality of classification models being used as a feature in another one of the plurality of classification models.

11. The method of claim 1, further comprising training the plurality of classification models using at least one of data sets from the monitoring nodes of the wind turbine or training a single coupled ensemble neural network.

12. The method of claim 1, wherein extracting, via the plurality of classification models, the plurality of features using the time series of operating data further comprises:
calculating the plurality of features over a sliding window of the time series of operating data;
generating an overall feature vector from the plurality of features, the overall feature vector comprising interactive features of the plurality of features from two or more monitoring nodes; and
reducing a dimension of the overall feature vector using a dimensionality reduction technique.

13. The method of claim 12, further comprising determining a length and duration of the sliding window using at least one of domain knowledge, data inspection, or batch processing.

14. The method of claim 1, further comprising optimizing a type and number of the plurality of features for each of the one or more monitoring nodes using at least one of domain-knowledge, feature engineering, or receiver operating characteristic (ROC) statistics.

15. The method of claim 10, wherein the decision fusion module comprises at least one of a logic operator or a weighted average of the outputs or a machine learning algorithm that maps multiple decisions to a single output.

16. A system for detecting a cyberattack on a control system of a wind turbine, the system comprising:
a controller comprising a plurality of classification models each comprising a base machine learning model and having a physical connection with a respective component of the wind turbine, the controller configured to perform a plurality of operations, the plurality of operations comprising:
receiving, via each of the base machine learning models of each of the plurality of classification models, a time series of operating data from one or more monitoring nodes of the wind turbine;
extracting, via each of the base machine learning models of each of the plurality of classification models, a plurality of features using the time series of operating data, each of the plurality of features being a mathematical characterization of the time series of operating data;
generating an output from each of the base machine learning models of the plurality of classification models; receiving, via a decision fusion module, the outputs from each of the base machine learning models of the plurality of classification models, the decision fusion module comprising an integrated machine learning model;
determining, via the integrated machine learning model of the decision fusion module, a probability of the cyberattack occurring on the control system based on a combination of each of the outputs; and
implementing a control action when the probability of the cyberattack exceeds a probability threshold, wherein the control action comprises isolating the cyberattack by disconnecting the physical connection associated with the respective component experiencing the cyberattack.

17. The system of claim 16, wherein the time series of operating data comprises at least one of pitch angle set point, measured pitch angle, performance proxy, wind acceleration, tower movement, nacelle movement, one or more pitch feedbacks, torque, wind speed, power output, generator speed, rotor speed, azimuth angle, one or more loading conditions, frequency, voltage, current, or functions thereof.

18. The system of claim 16, wherein the mathematical characterization comprises at least one of maximum, minimum, mean, standard deviation, variance, settling time, Fast Fourier Transform ("FFT") spectral components, linear and non-linear principal components, independent components, sparse coding, or deep representation learning.

19. The system of claim 16, wherein each of the outputs comprises a scalar score representing the probability of the cyberattack occurring on the control system.

20. The system of claim 19, wherein determining the probability of the cyberattack occurring on the control system based on the combination of each of the outputs further comprises:
identifying any of the scalar scores exceeding a score threshold; and
determining the probability of the cyberattack occurring on the control system based on the combination of each of the scalar scores.

* * * * *